United States Patent [19]

Pandl et al.

[11] Patent Number: 5,004,807
[45] Date of Patent: Apr. 2, 1991

[54] COPPER FORMAZAN REACTIVE DYES CONTAINING A MONOFLUOROTRIAZINE OR MONOCHLOROTRIAZINE GROUP

[75] Inventors: Klaus Pandl, Ludwigshafen; Manfred Patsch, Wachenheim, both of Fed. Rep. of Germany

[73] Assignee: BASF Aktiengesellschaft, Ludwigshafen, Fed. Rep. of Germany

[21] Appl. No.: 267,347

[22] Filed: Nov. 4, 1988

[30] Foreign Application Priority Data

Nov. 5, 1987 [DE] Fed. Rep. of Germany ....... 3737536

[51] Int. Cl.$^5$ .................. C09B 62/095; C09B 50/00; C09B 67/24; D06P 3/66
[52] U.S. Cl. .................................... 534/618; 534/652
[58] Field of Search ......................... 534/618

[56] References Cited

U.S. PATENT DOCUMENTS 4,556,706  12/1985  Hegar et al. ................ 534/618

FOREIGN PATENT DOCUMENTS 3434818  4/1985  Fed. Rep. of Germany ...... 534/618
2295090  7/1976  France ............................ 534/618
2172896  10/1986  United Kingdom ............. 534/618

OTHER PUBLICATIONS

Houben-Weyl, Methoden der Organischen Chemie, vol. 10/2, 1967, pp. 487 and 488.

Primary Examiner—Floyd D. Higel
Attorney, Agent, or Firm—Oblon, Spivak, McClelland, Maier & Neustadt

[57] ABSTRACT

Copper formazan reactive dyes of the formula:

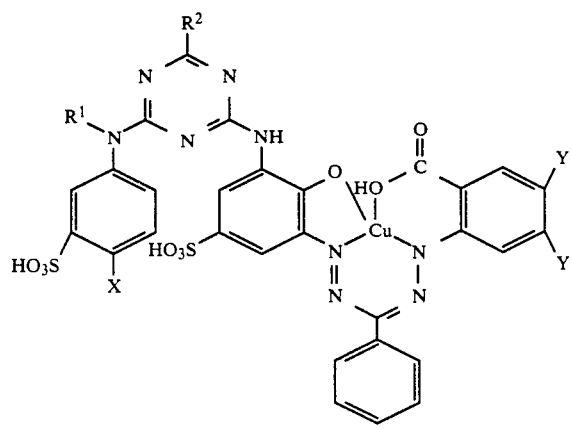

where X is cyano, halogen, $C_1$–$C_4$-alkyl or $C_1$–$C_4$-alkoxy, one of two radicals Y and Z is hydrogen and the other is hydroxysulfonyl, $R^1$ is hydrogen, $C_1$–$C_4$-alkyl or cyano- or carbamoyl-substituted $C_2$–$C_4$-alkyl and $R^2$ is fluorine or chlorine, and salts thereof are useful for dyeing cellulose fibers, resulting in blue shades. Such dyes are soluble in water and have a high fastness level and tinctorial strength.

2 Claims, No Drawings

COPPER FORMAZAN REACTIVE DYES CONTAINING A MONOFLUOROTRIAZINE OR MONOCHLOROTRIAZINE GROUP

The present invention relates to novel reactive dyes which have a chromophore based on a copper formazan dye and as the reactive group a monofluoro- or monochlorotriazine system and to the use thereof for dyeing cellulose fibers.

DE-A-3,434,818 discloses copper formazan reactive dyes which have a monochlorotriazine radical as the reactive system. However, it has been found that the dyes described therein have inadequate application properties, for example insufficient solubility in the dyebath, low tinctorial strength and a poor color buildup on application in medium or deep shades.

It is an object of the present invention to provide new copper formazan reactive dyes which no longer have the abovementioned defects.

We have found that this object is achieved with a novel copper formazan reactive dye of the formula I

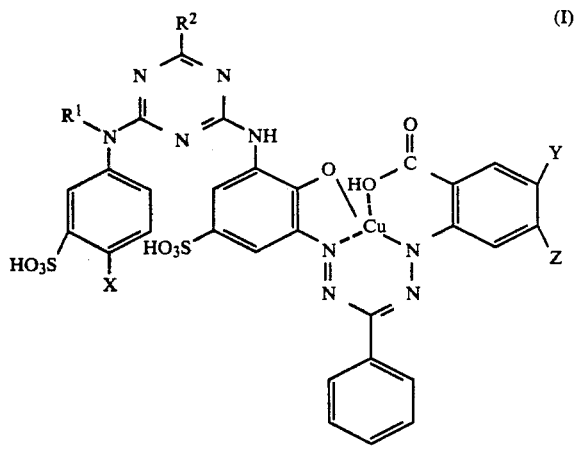

where X is cyano, halogen, $C_1$–$C_4$-alkyl or $C_1$–$C_4$-alkoxy, one of the two radicals Y and Z is hydrogen and the other hydroxysulfonyl, $R^1$ is hydrogen, $C_1$–$C_4$-alkyl or cyano- or carbamoyl-substituted $C_2$–$C_4$-alkyl and $R^2$ is fluorine or chlorine, or a salt thereof.

All the alkyl groups appearing in the abovementioned formula can be not only straight-chain but also branched.

X and R are each for example methyl, ethyl, propyl, isopropyl, butyl, isobutyl or sec-butyl.

X is further for example methoxy, ethoxy, propoxy, isopropoxy, butoxy or isobutoxy.

R is further for example 2-cyanoethyl, 2-cyanopropyl, 3-cyanopropyl, 1-cyanoprop-2-yl, 2-cyanoprop-2-yl, 2-cyanobutyl, 4-cyanobutyl, 2-aminocarbonylethyl, 2-aminocarbonylpropyl, 3-aminocarbonylpropyl, 2-aminocarbonylbutyl or 4-aminocarbonylbutyl.

Salts which come into consideration for copper formazan reactive dyes of the formula I are metal or ammonium salts. Metal salts are in particular the lithium, sodium or potassium salts. Ammonium salts for the purposes according to the invention are those salts which have either unsubstituted or substituted ammonium cations. Substituted ammonium cations are for example monoalkyl-, dialkyl-, trialkyl-, tetraalkyl- or benzyltrialkylammonium cations of those cations which derive from nitrogen-containing five- or six-membered saturated heterocyclics, such as pyrrolidinium, piperidinium, morpholinium, piperazinium or N-alkyl-piperazinium cations or N-monoalkyl- or N,N-dialkyl-substituted products thereof. Alkyl for the purposes of the present invention is in general straight-chain or branched $C_1$–$C_{20}$-alkyl which may be substituted by hydroxyl groups and/or interrupted by oxygen atoms.

Preference is given to copper formazan reactive dyes of the formula I where X is halogen, in particular chlorine. Further preference is given to copper formazan reactive dyes of the formula I where $R^1$ is hydrogen.

Prominence is given in particular to those copper formazan reactive dyes of the formula I where $R^2$ is chlorine.

The novel copper formazan reactive dyes of the formula I can be prepared in a conventional manner. They are obtained for example by reacting cyanuric fluoride or chloride with a copper formazan dye of the formula II

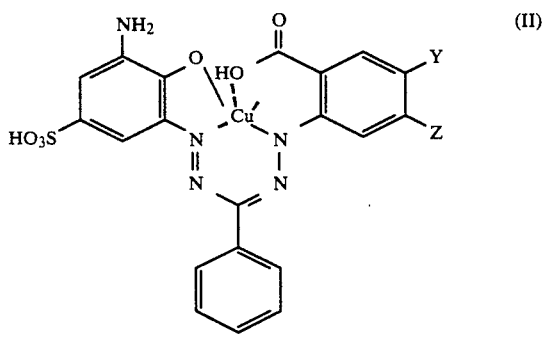

where Y and Z are each as defined above, to form a dye of the formula III

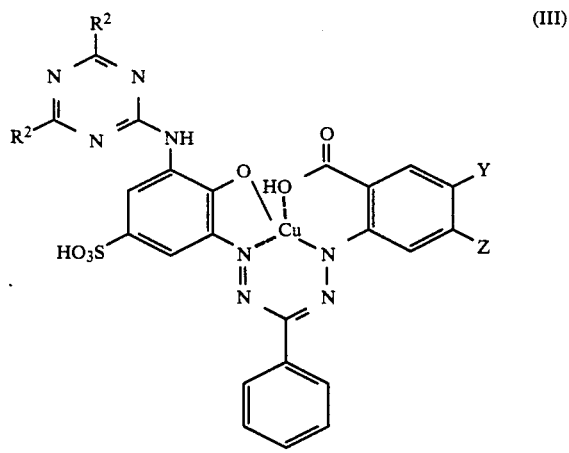

where $R^2$, Y and Z are each as defined above, which is then reacted further with an amine of the formula IV

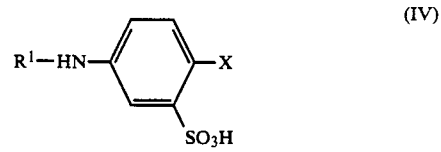

where $R^1$ and X are each as defined above, to give the dye of the formula I according to the invention.

The copper formazan dye of the formula II can also be prepared in a conventional manner. It is obtained for example by coupling the diazonium salt of 1-hydroxy-2-amino-6-acetylaminobenzene-4-sulfonic acid with a phenylhydrazone of the formula V

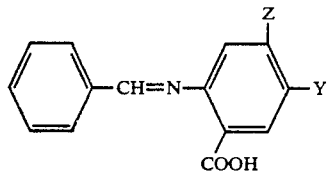

(V)

where Y and Z are each as defined above, then turning the reaction product into a copper complex by reaction with copper sulfate or copper chloride, and finally hydrolyzing the acetylamino group to give a free amino group (cf. Houben-Weyl, Methoden der Organischen Chemie, volume 10/2, pages 487 and 488, 1967).

Details of the preparation are given in the Examples.

The novel copper formazan reactive dyes of the formula I are suitable for dyeing cellulose fibers, giving dyeings in medium blue shades. The dyes according to the invention are highly soluble not only in water but also in up to 30% strength by weight aqueous sodium chloride solutions. They have a very high fastness level and a high tinctorial strength. The color buildup in medium to deep dyeings is particularly high.

The following Examples will illustrate the invention in more detail:

EXAMPLE 1

39 g of cyanuric chloride were added to a solution of 124 g of the sodium salt of the compound of the formula

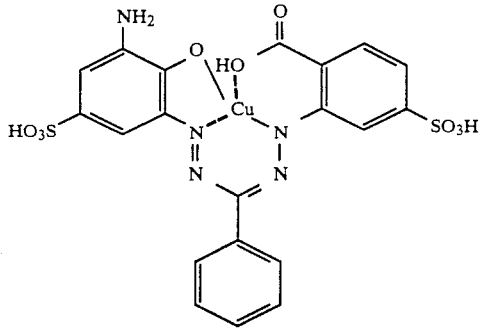

in 300 ml of water and 300 g of ice. The pH of the reaction mixture was maintained at from 5 to 5.5 until the end of the acylation by adding sodium bicarbonate. After 2 hours 44 g of 2-chloro-5-aminobenzenesulfonic acid, dissolved in 200 ml of water, were added, the suspension was warmed to 45° C., and the pH of the reaction mixture was held at from 7 to 8 by adding sodium bicarbonate. After 3 hours the dye product of the formula

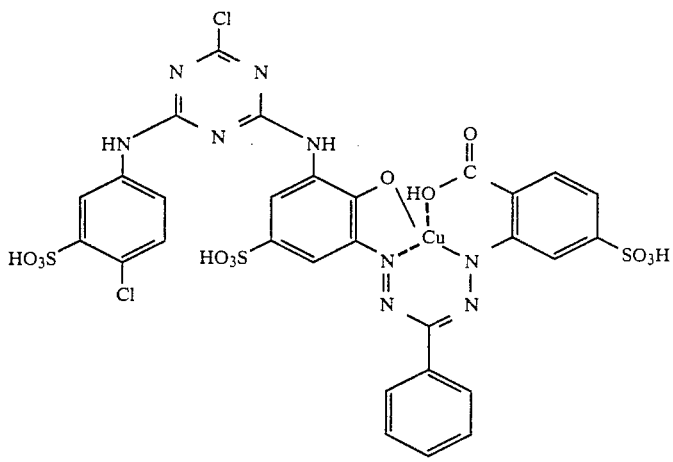

was salted out with a mixture of sodium chloride and potassium chloride in the form of a sodium salt, filtered off and dried. The dark blue dye powder obtained is highly water-soluble and dyes cotton in bright blue shades. The dyeings are light- and wet-fast. They show remarkable stability to oxidative action.

EXAMPLE 2

44 g of 2-chloro-5-aminobenzenesulfonic acid were suspended in 600 ml of water, and 28 g of trifluorotriazine were added at 0° C. and pH 1.4. During the addition of the the triazine the pH was kept below 2 with NaHCO$_3$. After 1 hour 124 g of the sodium salt of the compound of the formula

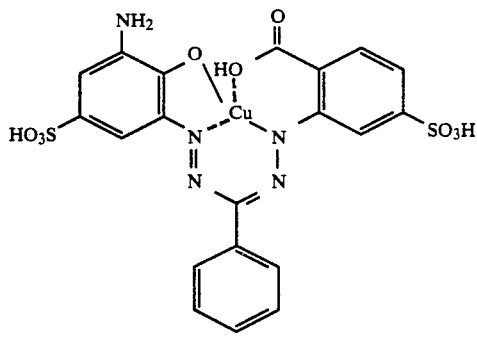

were added, and the reaction temperature was raised to 20° C. For 1.5 hours the pH was maintained at from 7 to 7.5 by adding NaHCO$_3$. Thereafter the dye product of the formula

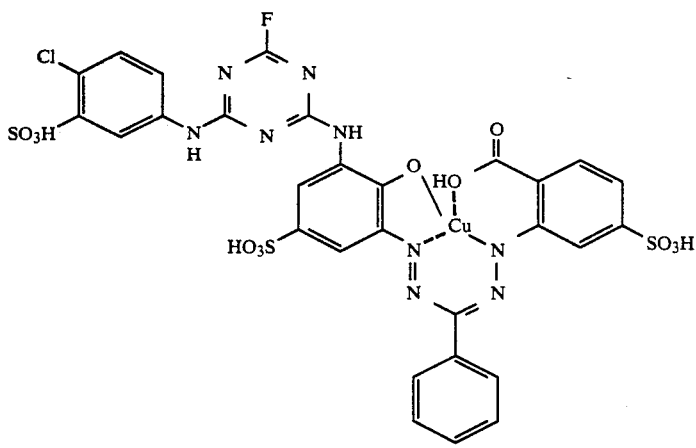

was salted out by means of sodium chloride in the form of a sodium salt and filtered off and dried. The dark blue dye powder obtained is highly water-soluble and dyes cotton in bright blue shades. The dyeings are light- and wet-fast. They show remarkable stability to oxidative action.

The same method gave the dyes of the formula

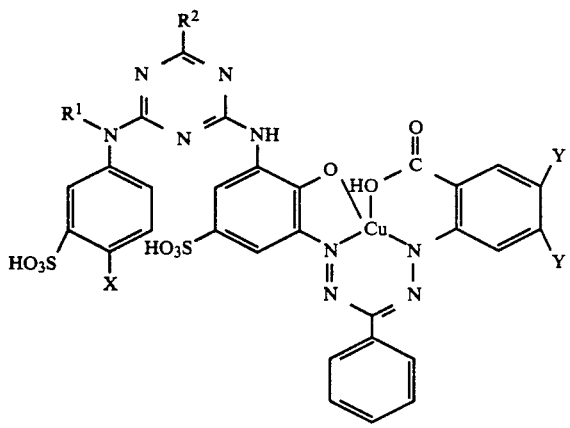

listed in the Table below. Applied by a conventional exhaust method, they dye cellulose fibers in blue shades.

The dyes are very readily soluble in water, are light-and wet-fast and show good stability to oxidative action.

| Ex. No. | R$^1$ | X | Y | Z | R$_2$ |
| --- | --- | --- | --- | --- | --- |
| 3 | H | OCH$_3$ | H | SO$_3$H | Cl |
| 4 | H | CH$_3$ | H | SO$_3$H | Cl |
| 5 | CH$_3$ | Cl | H | SO$_3$H | Cl |
| 6 | CH$_3$ | CH$_3$ | H | SO$_3$H | Cl |
| 7 | H | Cl | SO$_3$H | H | Cl |
| 8 | H | CH$_3$ | SO$_3$H | H | Cl |
| 9 | H | OCH$_3$ | SO$_3$H | H | Cl |
| 10 | Cl | CH$_3$ | SO$_3$H | H | Cl |
| 11 | CH$_3$ | CH$_3$ | SO$_3$H | H | Cl |
| 12 | H | OCH$_3$ | H | SO$_3$H | F |
| 13 | H | CH$_3$ | H | SO$_3$H | F |
| 14 | CH$_3$ | Cl | H | SO$_3$H | F |
| 15 | CH$_3$ | CH$_3$ | H | SO$_3$H | F |
| 16 | H | Cl | SO$_3$H | H | F |
| 17 | H | CH$_3$ | SO$_3$H | H | F |
| 18 | H | OCH$_3$ | SO$_3$H | H | F |
| 19 | CH$_3$ | CH$_3$ | SO$_3$H | H | F |
| 20 | CH$_3$ | CH$_3$ | SO$_3$H | H | F |

We claim:

1. A copper formazan reactive dye of the formula

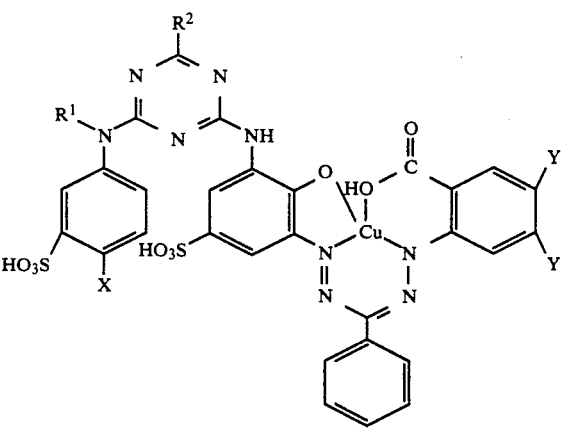

where X is cyano, Cl, C$_1$–C$_4$-alkyl or C$_1$–C$_4$-alkoxy, one of the two radicals Y and Z is hydrogen and the other is hydroxysulfonyl, R$^1$ is hydrogen and R$^2$ is fluorine or chlorine, or a salt thereof.

2. The dye of claim 1, wherein X is Cl.

* * * * *